J. H. PEGG.
VAULT.
APPLICATION FILED DEC. 21, 1915.

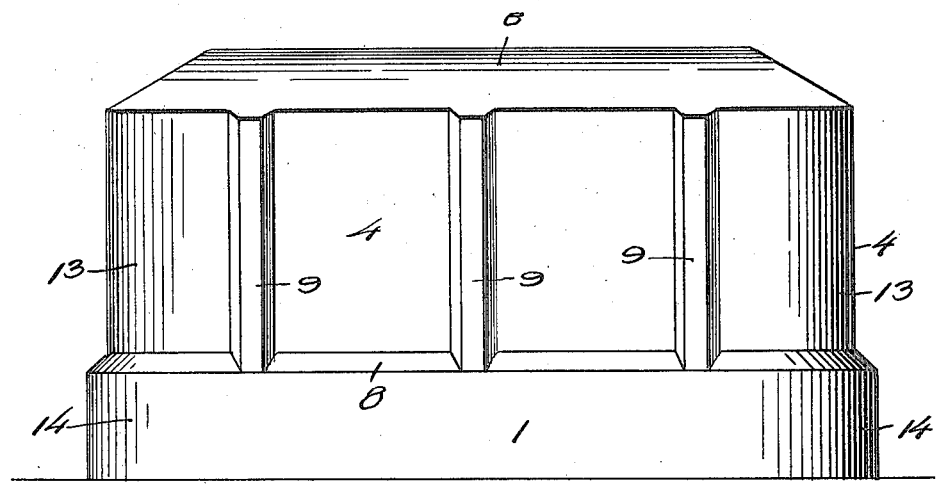
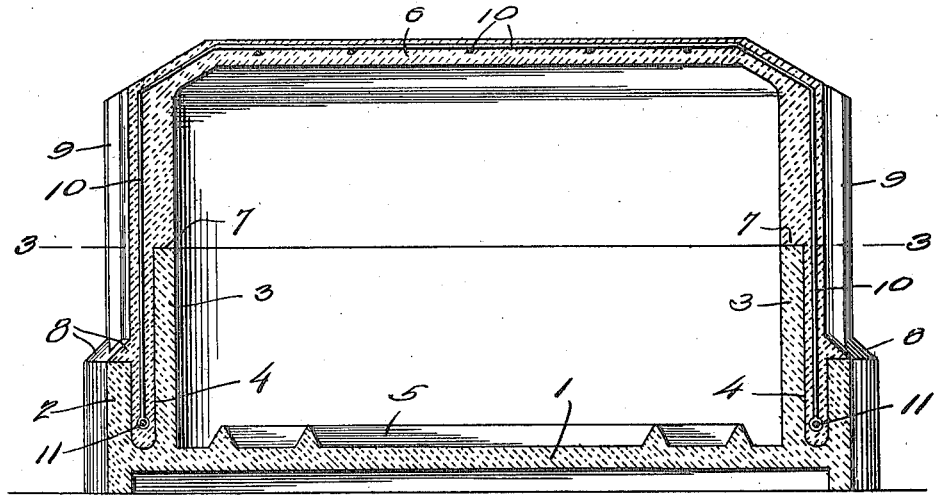

1,190,579.

Patented July 11, 1916.
2 SHEETS—SHEET 2.

Witnesses

Inventor
J. H. Pegg,
Jerry A. Mathews
Attorney

UNITED STATES PATENT OFFICE.

JOHN H. PEGG, OF WABASH, INDIANA.

VAULT.

1,190,579.

Specification of Letters Patent.

Patented July 11, 1916.

Application filed December 21, 1915. Serial No. 68,036.

*To all whom it may concern:*

Be it known that I, JOHN H. PEGG, a citizen of the United States, residing at Wabash, in the county of Wabash and State of Indiana, have invented a new and useful Vault, of which the following is a specification.

My invention relates to a concrete vault of improved construction.

One of the objects of my invention is to provide a vault having novel extended corners for the admission of caskets having large round corners.

It is a further object of my invention to provide a vault which by reason of its novel construction has greater durability and strength than the ordinary vault and which will not crack along the top edge, as occurs with many vaults.

It is a further object of my invention to provide novel reinforced ribs to strengthen the vault.

It is a further object of my invention to provide a novel and improved base for the vault; and to provide a novel interlocking construction of the base and sides of the vault whereby to render it worm-proof and water tight.

It is a further object of my invention to provide a novel construction that will compress air within the vault when it is sealed to insure against any water entering the vault.

It is also my object to provide other novel shapes and combinations of parts as more fully hereinafter set forth; and to employ any suitable plastic composition.

I attain the objects of my invention by the mechanism illustrated in the accompanying drawings, in which—

Figure 3:
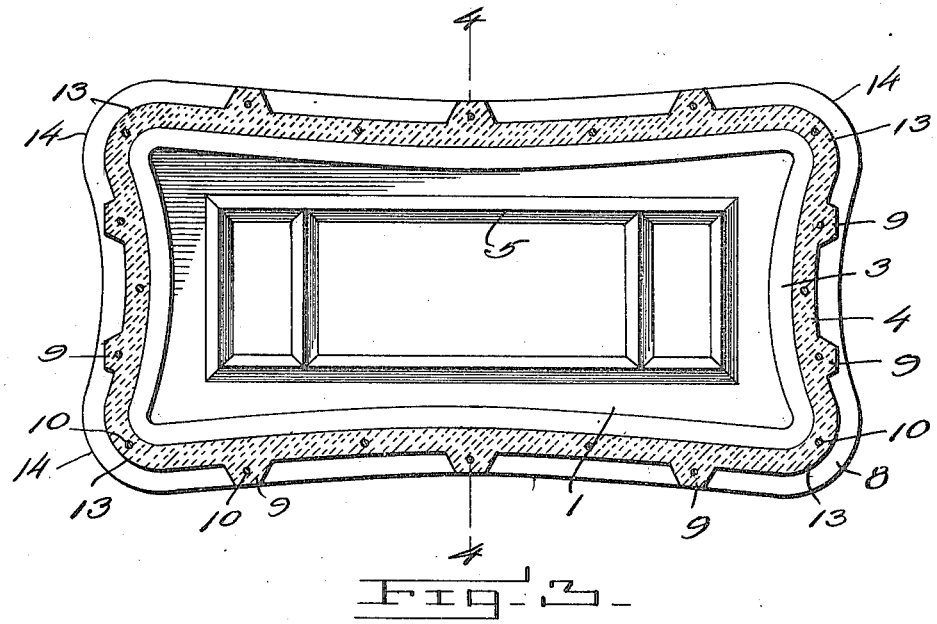
Figure 4:
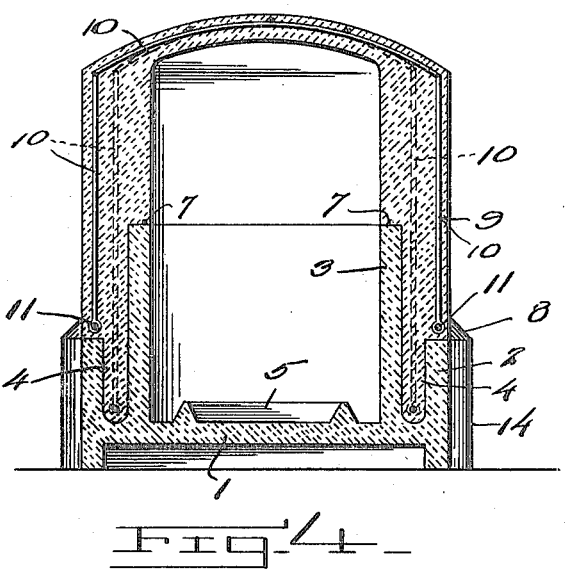

Figure 1 is a side elevation; Fig. 2 is a longitudinally vertical section through the median line of the vault; Fig. 3 is a section on line 3—3 of Fig. 2; and Fig. 4 is a transverse section on line 4—4 of Fig. 3.

Like characters of reference designate like parts throughout the several views.

Referring to the accompanying drawings, I provide a concrete base 1 having a novel outer wall 2 extending upwardly as shown, and an inner wall 3 spaced therefrom and extending upwardly as shown to a height substantially greater than the height of outer wall 2. The base 1 of my vault is further provided with suitable casket-supporting rests 5, as shown. The vault has its top portion which is mounted on the base constructed as shown, consisting of a rounded top 6, sides 4, and a plurality of exterior vertical ribs 9 adapted to strengthen the vault. Ribs 9 are tapered at the top to conform with the outline of the rounded top 6 of the vault. I provide suitable reinforcing members 10, disposed as shown, extending vertically up the sides of the vault and through the top to reinforce the concrete and insure against the possibility of cracking which has been a defect of vaults heretofore constructed. Members 10 may be suitable rods or heavy wires. I further provide suitable horizontal reinforcing members 11, encircling the vault and to which vertical reinforcing members 10 are attached, to increase the strength and durability of the vault. I further provide a novel shoulder member 8 positioned to engage over the top of outer wall 2 of base 1, said shoulder member 8 being formed on sides 4 and encircling the vault, the shoulder 8 being of tapering form as shown. On the floor of the vault base 1 I provide suitable casket rests 5, constructed integral with base 1.

A further novel and important feature of my invention is the enlarged projecting rounded corners 13 (for the upper portion of the vault) and similar rounded corners 14 for the base 1. Some caskets are constructed with large round corners, and in some instances these corners have had to be removed before the casket could be placed in vaults without enlarged corners such as have heretofore been the only form of construction.

It will be further observed that I have provided sides 4 having a rounded edge fitting snugly in a corresponding rounded groove in the base 1 between walls 2 and 3, as shown in the drawings.

It will further be observed that I provide a shoulder 7, positioned to engage over the top of inner wall 3 of the base 1, said shoulder being an integral portion of sides 4 of the top section of the vault.

The operation of the invention, as is obvious from the foregoing description in connection with the accompanying drawings, consists in mounting top section of the vault on the base, the sides 4 projecting into the space between walls 2 and 3 of the base; shoulder member 8 engages over the top of outer wall 2 of base 1; and inner shoulder 7 engages over the top of inner wall 3, thus providing a water tight and worm-proof vault.

It will further be observed that as the vault members are brought together, sealing the vault, the air is compressed within the vault, resulting in a novel air-pressure vault.

It will further be observed that the disposition of the reinforcing members (rods or wires) 10 and 11 is such as to effectually prevent cracking of the vault around the top, which has been a frequent defect of vaults heretofore devised. The reinforcing members in my vault extend up the sides and through the top of the vault, as shown.

The enlarged corners 13 and 14 of the vault, which is a novel feature in my invention permit of the introduction of caskets having trimmings or enlargements at the corners which would interfere with its introduction in a vault of the usual shape.

What I claim is:

A plastic reinforced vault comprising a base having spaced upstanding walls, the inner wall being of greater height than the outer wall, a body member having the lowermost portion of its side extending into the space between the upstanding walls of the base and having a horizontally extending shouldered portion projecting over and resting on the top of the outermost wall to render the vault insect proof and air tight, spaced reinforcing outwardly projecting ribs on the sides of the body of the vault, spaced reinforcing members embedded in said ribs and disposed in substantially inverted U-form in the sides and across the top of the vault body to provide continuous transverse reinforcement to prevent cracking of the vault substantially as set forth.

JOHN H. PEGG.

Witnesses:
 JOSEPH A. BERRY,
 ROY ELLIS.